July 22, 1930.  M. BERMAN  1,770,907

STRESS MEASURING MACHINE

Filed Aug. 16, 1927   2 Sheets-Sheet 1

Morris Berman
INVENTOR.

July 22, 1930.  M. BERMAN  1,770,907
STRESS MEASURING MACHINE
Filed Aug. 16, 1927  2 Sheets-Sheet 2
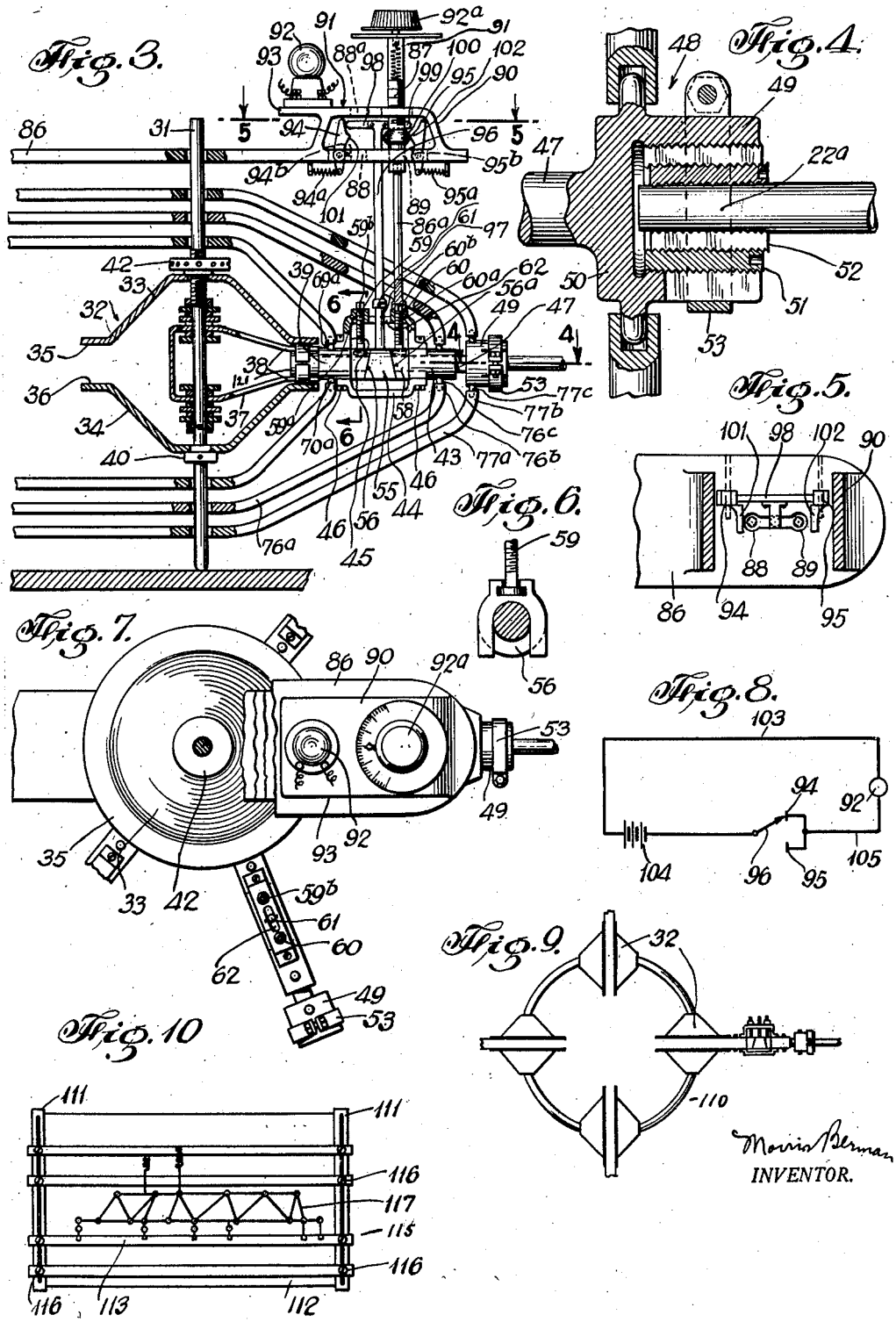
Morris Berman
INVENTOR.

Patented July 22, 1930

1,770,907

UNITED STATES PATENT OFFICE

MORRIS BERMAN, OF NEW YORK, N. Y.

STRESS-MEASURING MACHINE

Application filed August 16, 1927. Serial No. 213,278.

This invention relates to stress measuring machines and particularly to a machine adapted to measure stresses in model trusses.

An object of my invention is to provide, previous to actual construction of a proposed structure, means for determining the stresses in its members and its reactions.

While engineers are able to calculate stresses in structures such as trusses which can be solved by the laws of statics, it becomes in many cases extremely difficult, if at all possible to ascertain the stresses in members of certain types of statically indeterminate structures, which structures would often prove economical according to the intuition of the engineer, but which he is not able to calculate, and therefore hesitates to employ in practice.

It is therefore a further object of my invention to provide a method whereby stresses in the members and at the supports of indeterminate and other structures may be determined with sufficient accuracy for practical purposes.

A further object of this invention is to provide means for and a method of determining stresses in trusses which cannot be calculated by laws of statics.

A further object of my invention is to provide means for developing new and economical designs for structures.

A further object is to provide means for a method of experimentally checking continuous beams, reactions and stresses in trusses, bents, beams, multi-planar structures, such as towers, and existing structures, continuous beams, and trusses which are fully or partly hinged or fixed, or a combination of hinged and fixed and for reactions and structures including solid web arches which are free or fully or partly fixed or hinged, all of said structural forms referred to in this paragraph, whether made of a plurality of members or of a single member, or of a number of members in fixed relation or provided with projections at various angles, will be hereinafter referred to by the term "structures".

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

Fig. 3 is an enlarged detail view of the panel point joint with the test scale and a force scale applied;

Fig. 4 is a cross-sectional view taken on line 4—4 of Fig. 3;

Fig. 5 is a cross-sectional view taken on line 5—5 of Fig. 3;

Fig. 6 is a cross-sectional view taken on line 6—6 of Fig. 3;

Fig. 7 is a top view of the structure shown in Fig. 3.

Fig. 8 is a diagrammatic view of the circuit for the indicating lamp.

Fig. 9 is a view of a multiplanar panel point joint.

Fig. 10 is a view of a modified form of frame structure.

Figure 1:
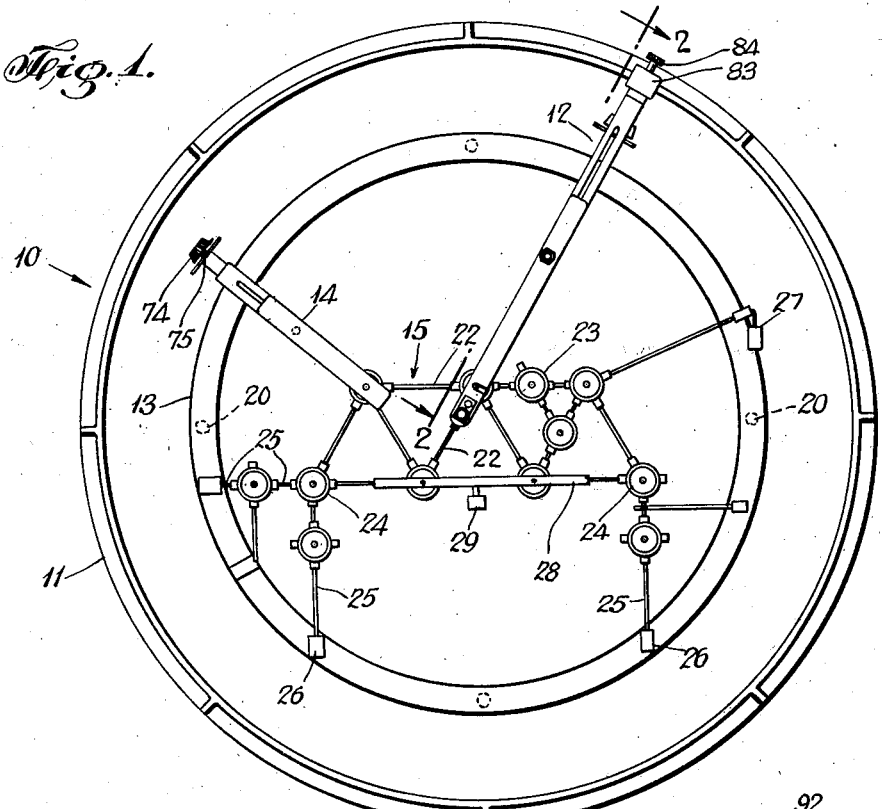
Fig. 1 is a top plan view of the stress measuring machine embodying the invention.

Referring to the drawing, 10 designates the testing structure embodying the invention which is here seen to comprise a circular frame member 11 anchoring the test scale 12 and an inner circular frame 13 anchoring the force scale 14 and mounting the truss model 15.

The frame 11 comprises a bottom plate 16 adapted to rest on a suitable base support 17 and a cylindrical flange 18. The inner frame 13 comprises a ring member 19, concentric with flange 18 and supported on plate 16 by spaced legs 20. Each of said legs 20 may be hinged to said plate 16 as at 21 so that they may be folded when not in use or to permit swinging movement of the scales 12, 14.

The truss model 15 comprises members 22 connected together at panel points 23 to make a small sized reproduction of the actual truss to be used. In Fig. 1 the model truss 15 is shown mounted at both ends thereof by panel points 24 connected to the ring 19 by members 25. The reactions in these members may be tested in a manner similar to testing the stress in any of the truss members 22 as will hereinafter be described. The members 25 are secured to ring 19 as by screw securing members 26 fixed to said ring. It will be understood, however, that said members 25 and 26 may be omitted if desired, and that the joint 24 may rest directly upon a suitable rigid support extending in the proper direction to take care of reaction forces in any direction. If, for instance, horizontal and vertical components of the reactions are to be measured, then a pair of said supports, one horizontal and one substantially vertical, may be employed, as indicated at the left truss support of Fig. 1. For testing the reaction at any support, a certain element of the joint 24 is released and said element is brought back to its initial position while the force required to do so is measured, as will be explained in more detail in connection with the testing of the stress in one of the truss members.

Forces may be applied to the truss 15, in proportion to the amount of the actual live and dead loads by the force scales 14, by a weighted pulley 27 or in any other suitable manner. A rail 28 may be placed on the truss and a moving load 29 drawn over said rail to apply a moving load to the truss. The members 22 may be miniature replica of sections to be used in the actual structure. However, wires or rods will suffice for tension members. For compression members steel tubes having radii of gyration proportional to the actual members of the structure may be used. The cross-sectional area of members used in the model should be proportional to the area of corresponding members of the structure.

Each of the panel point joints 23 comprises a shaft 31 having a bottom end portion abutting plate 16. A casing 32 may be mounted on said shaft 31 comprising cup-shaped members 33, 34 having flange rim portions 35, 36, respectively. Said rim portions face each other. Housed within the casing 32 and mounted on said shaft 31 are strap members 37 each having converging arms 38 extending between said rims 35, 36. Said arms 38 are adapted to frictionally grip a sleeve member 39 upon clamping the rims 35, 36 together. To this end the casing member 34 is adapted to abut against a shoulder 40 fixed to shaft 31 while the upper member 33 abuts a wheel 42 having a screw threaded connection with said shaft 31. Turning the wheel 42 will bring the cup members together and clamp the sleeve 39 between the rim portions 35, 36. Four strap members 37 are shown and each is pivoted on the shaft 31. Each of said members is provided with arms 38 having portions extending between the rims 35, 36 and gripping a sleeve 39. These strap members may be adjusted to any desired angular position before clamping to the casing 32.

The sleeve 39 may be connected to an aligned sleeve 43 by brackets 44, 45 screwed to said sleeves at 46. Extending thru said sleeves 39, 43 is a shaft 47 terminating beyond sleeve 43 in a chuck member 48. Said chuck is provided with means for gripping one end $22^a$ of a member 22. Said means comprises a cylindrical slotted flange portion 49 extending from the back wall 50 formed at the end of said shaft 47. Within the flange 49 are two concentric split sleeves 51, 52 having serrated peripheries interengaging the inner serrated surface of flange 49 and the similarly serrated end portion $22^a$ of member 22. A split ring 53 may be clamped over the flange 49 to produce a strong gripping action on said end portion $22^a$. The other strap members 37 are likewise provided with sleeves 43, shafts 47, and chucks 48 for connecting to member 22. The clearance between the shaft 31 and the strap members 37 is an important factor to consider in statically indeterminate structures, where the slightest play or lost motion between these parts will have its effect in changing the deflection characteristics of the truss, and will affect the ultimate elongation or shortening of the members and hence the stresses in them. While the play can be made very slight and practically negligible by careful machining, it can also be entirely eliminated. For instance, the hole in the strap through which the shaft 31 passes being slightly larger than the shaft itself, the strap may be moved before the structure is loaded in the direction of the length of the member, until the shaft 31 is in contact with the side of the hole. For tension, the strap should be moved until the shaft engages the furthermost part of the hole, and for compression, the shaft would engage the innermost part of the hole. This should be done before the ring 53 is tightened and before the split ring 121 is clamped about the ends of the arm 38. The play may also be eliminated by rotation of the serrated sleeves 51 or 52 in the proper direction, which rotation will also cause the shaft 31 to engage the hole in the strap. The casing 32 may be tightened before loads are applied to obtain fixed instead of hinged joints at the panel points by means of the wheel 42. For hinged joints the sleeve 121 is moved out of contact with casing projections 35 and 36.

To the portion of the shaft 47 extending between the sleeves 39 and 43 may be attached a wedge 55 having tapering surfaces 56, $56^a$. On both sides of said wedge 55 and cooperating with said surfaces 56, $56^a$ are wedge shaped U members 57, 58 straddling the shaft 47. Said members 57, 58 are connected to upstanding screw threaded shafts 59, 60 respectively. Said shafts 59, 60 are threaded to cooperate with internally threaded openings 59ª, 60ª in bracket 45. The upper portion of each of said shafts 59, 60 is formed square as at 59ᵇ, 60ᵇ for a purpose hereinafter appearing. The wedge 55 is also provided with an integral upstanding post 61 extending thru a slot 62 in bracket 45.

It will now be apparent that the member 22 is fixed to shaft 31 when said member is under compression or tension. This is so since the force in said member 22 is transmitted thru chuck 48, shaft 47 and wedge 55 to either wedge 57 or 58 depending upon whether said member 22 is under tension or compression. Force transmitted to wedges 57 or 58 passes thru the sleeves 39 or 43 to casing 32 and thus to shaft 31.

Figure 2:
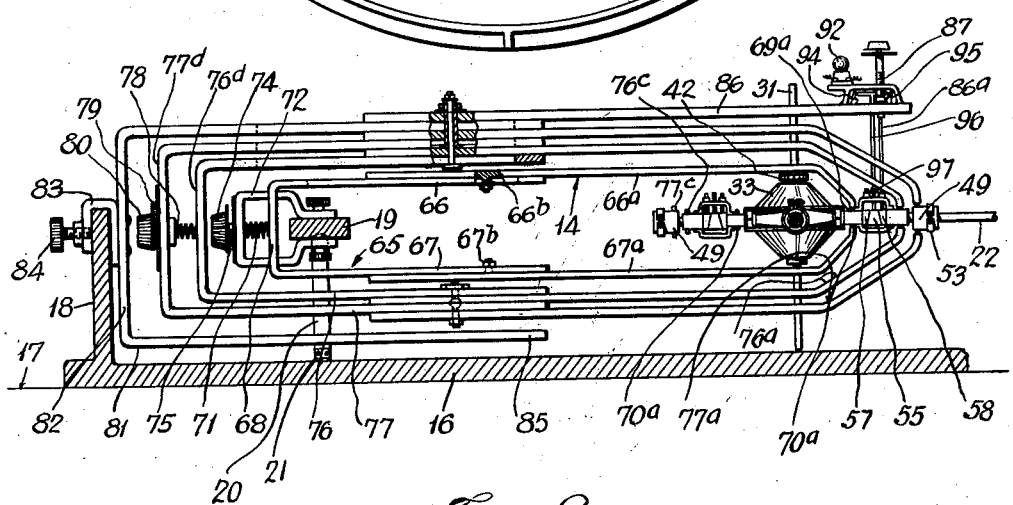
Fig. 2 is a cross-sectional view taken on line 2—2 of Fig. 1.

Force may be applied to the panel point joint 23 by a force scale 14, one of which is shown mounted within the test scale 12. See Figs. 2 and 3. Said scale 14 comprises a U member 65 having arms 66 and 67 and a portion 68 connecting said arms. Said arms 66, 67 are connected to members 66ª, 67ª, respectively, by bolt and slot connections 66ᵇ, 67ᵇ to permit adjustment of said members 66ª, 67ª. Said arms 66ª, 67ª are bent inwardly adjacent their end portions and terminate in sockets 69', 70', receiving projections 69ª, 70ª, diametrically formed on sleeve member 39. A spring 71 is interposed between said connecting portion 68 and a bracket 72 fixed to ring 19. Said spring 71 may be tensioned by turning a dial 74 mounted at the end of a shaft 75 having screw threaded engagement with said bracket 72 and connected at its other end with the spring 71. When said dial is turned for tensioning spring 71, a force will be applied thru projections 69ª, 70ª on sleeve 39 to casing 32 and thus to the shaft 31. The forces applied to the model are proportional to the actual loads and the member 22 will therefore be stressed proportionally to the actual stresses in the proposed structure.

The underlying principle of the testing machine embodying the invention as applied to trusses is that if one end of a member 22 be disconnected from the rest of the panel point joint 23 and brought to position again by a force-applying measuring scale, then the force required to restore said end to its former position would be the amount of stress in said member. It will be understood that the panel point joint and the end of the member are moved relatively to each other when brought back to initial position, and that all of the movement need not be confined either to the panel point joint or to the end of the member alone. The spring scale 12 is provided for carrying out this measurement. Said scale 12 comprises two concentric members 76, and 77 shaped similar to force scale 14. The inner member 76 has converging arms 76ª terminating in sockets 76ᵇ, receiving outwardly projecting pins 76ᶜ on sleeve 43. The outer member 77 has converging arms 77ª terminating in sockets 77ᵇ receiving outwardly projecting pins 77ᶜ formed on chuck 48. A coil spring 78 is interposed between the end walls 76ᵈ, 77ᵈ of said members 76, 77. A shaft 79 having screw threaded engagement with the end wall 77ᵈ is secured to said spring. A dial 80 is secured to the end of said shaft. When said spring 78 is in untensioned neutral state the coils thereof are spaced. Thus turning of the dial in one direction will place the spring under compression, while turning the dial in the opposite direction will tension the spring. Thus turning said dial one way or the other way will either tend to move the member 22 relatively to the panel point joint 23 in one direction or the opposite direction. This relative movement, however, is not possible as long as the wedges 57 and 58 are tightly in place.

Means are provided to aid in supporting the test scale 12. Said means comprises a frame 81 having an end wall 82 secured to a U-shaped member 83 straddling the wall 18 and removably secured thereto as by a stud 84. Said frame 82 further comprises arms 85 and 86 parallel to the arms of the test scale 12. The upper arm 86 is extended beyond the sleeve 43. Said arm 86 mounts means for removing the wedges 57 or 58 to permit relative movement between the member 22 and the panel point 23. When said member 22 is thus disconnected from and is permitted to move relatively to said panel point 23, the dial 80 is turned to cause the force of spring 78 to return the member 22 to its original position. This force may be measured in dial 80. The arm 86 further mounts means for determining when the member 22 has been returned to its exact former position.

The means for removing either the wedges 56 or 57 comprises a connecting member 86ª having a square socket for receiving either the square end 59ᵇ or 60ᵇ. The other end of said member 86ª is likewise square shaped. A micrometer member 87 having a square shaped socket at one end is adapted to receive said square end of connecting member 86ª. The arm 86 is formed with apertures 88, 89 aligned with shafts 59, 60. A bracket 90 is formed at the end of said arm 86 and is adapted to straddle the apertures 88, 89. The top wall 91 of said bracket 90 is spaced from arm 86 and is formed with apertures 88ª, 89ª aligned with apertures 88, 89 in arm 86. The micrometer member 87 and connecting arm may be passed thru either apertures 88, 88ª or 89, 89ª to engage either the shaft 59 or 60. Said micrometer is connected to a spring 91 which is in turn connected to a dial 92ª. Turning the dial in one direction will turn the micrometer and connecting rod and consequently draw out the wedge. Turning the dial in the opposite direction will of course return the wedge. The exact return position of the wedge may be noted by reading the micrometer scale.

If the member 22 is under compression the wedge 55 will press against wedge 57. If the member 22 is under tension then said wedge 55 will press against wedge 58. Thus to determine whether the member 22 is under tension or compression it is merely necessary to pull out wedge 57 or 58. If practically no force is required to pull out wedge 57 then stress in member 22 is tension; if no force is required to pull out wedge 58 then stress in member 22 is compression, and conversely, where noticeable force is required to pull out said wedge 57 or 58 there will be compression or tension, respectively in said member 22. Of course, it is the wedge which is tightly wedged that will be pulled out by the micrometer and connecting rod to permit longitudinal movement of wedge 55, rod 47, chuck 48 and member 22.

Additional means are provided for determining the exact point at which the wedge which has been pulled out, is returned to its original position. Said means comprises an electric lamp 92 secured on a shelf 93 extending from the brackets 90. Arms 94 and 95 are pivoted to arms 86 adjacent the apertures 88, 89. Springs 94$^a$, 95$^a$ secured to said arm 86 and to the lower ends of pivoted arms 94 and 95, respectively tend to move the upper ends of said arms toward each other. Stops 94$^b$, 95$^b$ are provided to limit this movement. A T-shaped member 96 may be connected at the lower end to the shaft 61 as by a pin and slot connection 97. Said member 96 comprises arms 98, 99 adapted to contact with the upper end portions of arms 94 and 95 when both the wedges 57 and 58 are in wedging position and the T member 96 is consequently centrally located. Movement of the T member to the right, caused by pulling out the wedge 58 (member 22 being under tension) will break the contact between the arms 98 and 94 since the stop 94$^b$ will prevent the upper end of arm 94 from following said arm 98. Likewise movement of T member 96 to the left, caused by pulling out the wedge 57 will break the contact between arms 99 and 95. The micrometer 87 is formed with a cam 100 located to coact with cams 101 or 102 formed on arms 94, 95 respectively, depending upon whether said micrometer is inserted thru the pair of aligned apertures on the right or left of said T member 96. Coaction of cam 100 with cam 101 will break the contact between arm 94 and 98. Coaction between cam 100 and cam 102 will break the contact between arms 95 and 99. A conductor 103 leading from one terminal of the lamp 92 is connected thru an electric power source 104 to T member 96. The other conductor 105 leading from the second terminal of said lamp is connected to both arms 94 and 95 as illustrated in Fig. 8. It may now be seen that when either of arms 98 or 99 contacts with arms 94 and 95, respectively, the circuit to the lamp is completed and the lamp is lighted. Insertion of the micrometer in apertures 89, 89$^a$ will break contact between arms 99 and 95 (see Fig. 3). Turning said micrometer to draw out the wedge 58 will permit movement of T member 96 to the right. This movement will break the contact between arms 98 and 94 and then the circuit to the lamp will be broken and the light goes out. Turning the micrometer in the opposite direction will return wedge 58 to its original position. Of course, the dial 80 must be rotated to move the member 22 back to its original position to permit the wedge 58 to be thus moved downwardly. When the wedge has returned to its original position the T member 96 will have been moved back to the left and the exact point, when the original position is reached, will be indicated when arms 98 again contact arm 94 to complete the lamp circuit by the lighting of the lamp. Similar operation takes place when the micrometer is inserted in apertures 88, 88$^a$ to pull out wedge 57.

As has been previously indicated, a panel point joint as 24, similar in all respects to the panel point joint 23 may be used for testing the reaction at any support of the structure. In that case, the terminal end 49 of the shaft 47 may rest or be attached directly or indirectly on or to a suitable rigid support. In that case, it will be understood that there is no end 22$^a$ of a truss member 22 to which the shaft 47 is secured but that the shaft itself corresponds in all respects and functions precisely the same as such an end 22, and that the force required to move said shaft after its release back to its initial position may be measured and the reaction accordingly determined.

Fig. 9 shows a multiplanar panel joint. Said joint comprises a circular shaft 110 on which the casing 32 is mounted in a manner similar to the manner of mounting said casing on straight shaft 31. This joint permits a panel point joint from which member 22 may extend in different planes.

Fig. 10 shows a modified form of frame structure which is seen to comprise parallel end frames 111 extending from a base plate 112. Cross members 113 are adjustably secured at their end portions to said frames 111. The adjusting means may comprise pin and slot connections 116. The model truss 117 may be secured to said cross-members 113 in a manner similar to that shown in Fig. 1. It is apparent that the force scales and test scales may likewise be applied to make the stress tests described above.

As the stresses of members of statically indeterminate structures also depend upon the area of said members, more correct sizes for members could be inserted in the model after the first series of stress readings is completed. This process may be repeated as often as accuracy of design demands.

The stress in any member may be tested at both of its ends and an average taken. This serves as a check.

It will be seen that my machine and method makes it possible also to ascertain with sufficient accuracy for practical purposes, the moment induced by secondary stresses such as those arising from riveting at any panel point of a truss where the end of the member is fixedly secured instead of hinged.

Pin-play or clearance at joints of structures, and also changed lengths of members due to temperature changes, may be simulated in the model by withdrawing the wedges a pre-calculated amount or changing model member areas for purpose. Similarly the possible changed stresses in model members due to their decreased length on account of the space taken up by the joints, may also be compensated for by slight changes of model member areas or slight withdrawal of wedges, thus permitting a predetermined amount of play or clearance at the shaft, which is the equivalent, for purpose of deflections, to changed lengths of model members used. Such pre-calculated amounts of play at shafts or changes of model member sizes to be used may be readily calculated, if such refinement is deemed necessary, by the methods of statically indeterminate structures. A model member whose end is rigidly connected at joints may be constructed of a section having a moment of inertia which offers a resistance to bending proportional to that of proposed member of structure. The actual bending moment at the end of a rigidly connected member—an essential secondary stress factor—may be measured by disengaging the end of the member at sleeve 39 from casing rims 35 and 36 by sliding sleeve 121 away from the rims, and measuring the force required to bring sleeve 39 and casing rims back again to their original relative positions, applying an opposing moment by use of test scale, which is attached as shown in Fig. 3 except that it is held perpendicular, instead of parallel, to member tested, arm 76 being connected with the shaft only, and arm 77 with member at 77$^b$.

It will thus be seen that there is provided a device in which the several objects of this invention are achieved, and which is well adapted to meet the conditions of practical use.

As various possible embodiments might be made of the above invention, and as various changes might be made in the embodiment set forth, it is to be understood that all matter herein set forth or shown in the accompanying drawing is to be interpreted as illustrative and not in a limiting sense. It will be also understood that the term "truss" as used in the claims is used in a broad sense as defining a loaded structure generally and not as defining any specific type of structure.

Having thus described my invention, I claim as new and desire to secure by Letters Patent:—

1. A stress measuring machine for a truss comprising a series of panel point joints, truss members connected to said panel point joints, means for disconnecting one end of a truss member from its panel point joint, and means for restoring said end to its original position and for measuring the forces required to restore said end to its original position.

2. A stress measuring machine for a truss comprising a plurality of truss members, means for disconnecting one end of a truss member from the truss, and means for restoring said end to its original position and for measuring the force required to restore said end portion.

3. A stress measuring machine for a truss comprising a panel point joint and a truss member connected thereto, means for disconnecting one end of the truss member from its panel point joint, means for restoring said end to its original position, and for measuring the force required to restore said end to its original position, and means for indicating the point at which said end is restored.

4. A stress measuring machine for a truss having a plurality of truss members comprising means for applying forces to the truss to stress the members of said truss, means for disconnecting one end of one of said members from the truss, and measuring means for restoring said end to its original position.

5. A stress measuring machine for a truss having a plurality of panel point joints and truss members connected thereto comprising means for applying forces to the truss to stress the members of said truss, means for disconnecting the end of one of said members from its panel point joint, and means for restoring said end and for measuring the force required to restore said end.

6. A stress measuring machine for a truss having truss members comprising means for applying forces to the truss to stress the members of said truss, means for disconnecting one end of one of said members from the truss, means for restoring said end to its original position, means for measuring the force required to restore said end to its original position, and means for indicating when said end is restored.

7. A stress measuring machine for a truss having a plurality of members comprising means for applying forces to the truss to stress the members of said truss, means for disconnecting one end of one of said members from the truss, means for restoring said end to its original position, means for measuring the force required to restore said end to its original position, and electrical means for automatically indicating when said end is restored.

8. The method of determining stress in a truss member consisting of loading a miniature model of said structure substantially proportionately to and in the direction of the actual loads on said structure, thereafter disconnecting one end portion of a member in said model corresponding to that member of the structure the stress of which is to be determined, and thereafter restoring said end portion to its original position and measuring the force required to restore said end of the truss member.

9. The method of testing the stress in a truss member of a truss having a plurality of truss members consisting of disconnecting one end portion of one of said members from the remaining structure and thereafter restoring said end portion to its original position, and measuring the force required to restore said end portion.

10. The method of determining stress in a truss member consisting of loading a miniature model of said structure substantially proportionately to the actual loads on said structure, thereafter disconnecting one end portion of a member of said model corresponding to that member of the structure the stress of which is to be determined, and thereafter restoring said end portions to its original position and measuring the force required to restore said end to its original position.

11. The combination with a miniature truss having separate loaded members, of means for hingedly connecting said members at points corresponding to similar points of the truss, said connecting means being provided with disconnectable elements, and means for moving said elements and for measuring the force required to move said elements.

12. A connector for the ends of truss members constituting the panel point joint of a model truss comprising a shaft, a strap pivoted to said shaft, a supporting member secured to said strap, a movable member arranged substantially at right angles to said shaft and movable relatively thereto, carried by said supporting member, clamping means for the end of a truss member mounted on said movable member, and a wedging element adapted to engage said movable member for allowing the movement of said movable member and therewith the end of a truss member relatively to said shaft.

13. In a panel point joint, an upright shaft, a strap pivoted to said shaft, a sleeve secured to said strap, a substantially horizontal shaft movable in said sleeve and terminating in clamping means for the end of a truss member and wedging means for regulating movement of horizontal shaft in a plane at substantially right angles to said first mentioned shaft.

14. In combination, a panel point joint comprising an upright shaft, a member pivoted to said shaft, a substantially horizontal shaft, means for supporting said horizontal shaft operatively connected to said pivoted member, serrated clamping means at the end of said horizontal shaft adapted to receive the end of a truss member, means for releasing said horizontal shaft for axial movement out of its initial position and for locking said shaft in its initial position, and means for indicating when the initial position of said shaft has been reached.

15. In combination with a structure having a panel point, a panel point joint comprising a first shaft normally arranged coaxially of the panel point, a second shaft pivoted to said first shaft and movable relatively thereto in the direction of its own axis, means for locking said second shaft in its initial position, means for releasing said second shaft for movement out of its initial position and for restoring said second shaft to its initial position, and means for indicating when said second shaft has been moved back to its initial position.

16. In combination, a panel point joint for the ends of miniature truss members comprising means for normally locking said member in predetermined angular position relatively to adjacent truss members in its initial position against axial movement, and adapted to be released for allowing axial movement of said truss member, means for indicating when said member is in its initial position, and means for measuring the force requred to bring said member back to its initial position after it has been moved therefrom.

17. In a stress measuring machine, clamping means for normally securing the end of a member of a miniature truss in a predetermined initial position and for allowing longitudinal movement of said member upon the release thereof, and means for measuring the force required to move said member back to its initial position after it has moved therefrom.

18. In a machine for measuring the stresses in the members of a truss at a point where said members are joined, means for locking the ends of said joined members in initial position and for allowing the movement in one direction of one of said members out of initial position upon the release thereof, the others of said members moving in a direction opposite to the direction of movement of the released member, and means for measuring the force required to move said released member back to said initial position comprising an extensible spring operatively connected at one end to said released member and at the other end to the remaining members, and means for measuring the distance which the spring is extended.

19. In a stress measuring machine, means for normally maintaining the end of a truss member of a miniature truss in predetermined initial position, and permitting movement of said truss member away from said position and a test scale for measuring the force required to move said member back to its initial position after it has been moved therefrom, comprising a spring operatively connected at one end to said member positioning means, and at the other end to said member, and means for extending said spring.

20. In a stress measuring machine, means for normally maintaining the end of a truss member of a miniature truss in predetermined initial position, and permitting movement of said truss member away from said position, means for indicating the initial position of said member, and a test scale for measuring the force required to move said member back to its initial position after it has been moved therefrom, comprising a spring operatively connected at one end to said member positioning means and at the other end, to said member, and means for extending said spring.

21. In a stress measuring machine, a frame, means for connecting predetermined loading points of a miniature truss to said frame and for putting predetermined loads upon the said points of the truss, means for connecting the truss members and for releasing one of said truss members at a time whereby axial movement of the released truss member results, means for indicating the initial position of the released truss member and means connected to said frame for exerting force upon the released truss member, and means for measuring the force required to move said released truss member back to its initial position.

22. The combination with a miniature truss comprising a series of members substantially proportional in length and area of cross-section to the members of the full size truss, and having means arranged at the ends of said members for connecting said members together, said connecting means being adapted to release one of said members at a time, a frame for supporting said miniature truss, load scales operatively connecting said connecting means to said frame, and a test scale operatively connected to said connecting means and to a released end of a member for measuring the force required to restore the released member to its initial position.

23. The combination with a miniature truss comprising wire tension members and tubular compression members, of joints at the panel points of the truss for connecting said wires and tubes and means operatively connected to said joints for indicating the stresses in disconnected ends of said wires and tubes at said members.

24. The combination with a miniature truss having wire tension members therein and tubular compression members, of panel point joints for connecting said members, said joints being adapted to release said members, and means operatively connected to said joints for measuring the stress in a member after the release thereof.

25. In combination, a panel point joint for the ends of miniature truss members comprising means for normally locking said member in predetermined angular position relatively to adjacent truss members in its initial position against angular movement, and adapted to be released for allowing angular movement of said truss member, means for indicating when said member is in its initial position, and means for measuring the force required to bring said member back to its initial position after it has moved therefrom.

Signed at 1947 Rockaway Parkway in the county of Kings and State of New York this 15th day of August, A. D. 1927.

MORRIS BERMAN.